Sept. 20, 1932.  E. H. LAMIELL  1,878,412
TRANSPLANTER
Filed Oct. 16, 1928   2 Sheets-Sheet 1
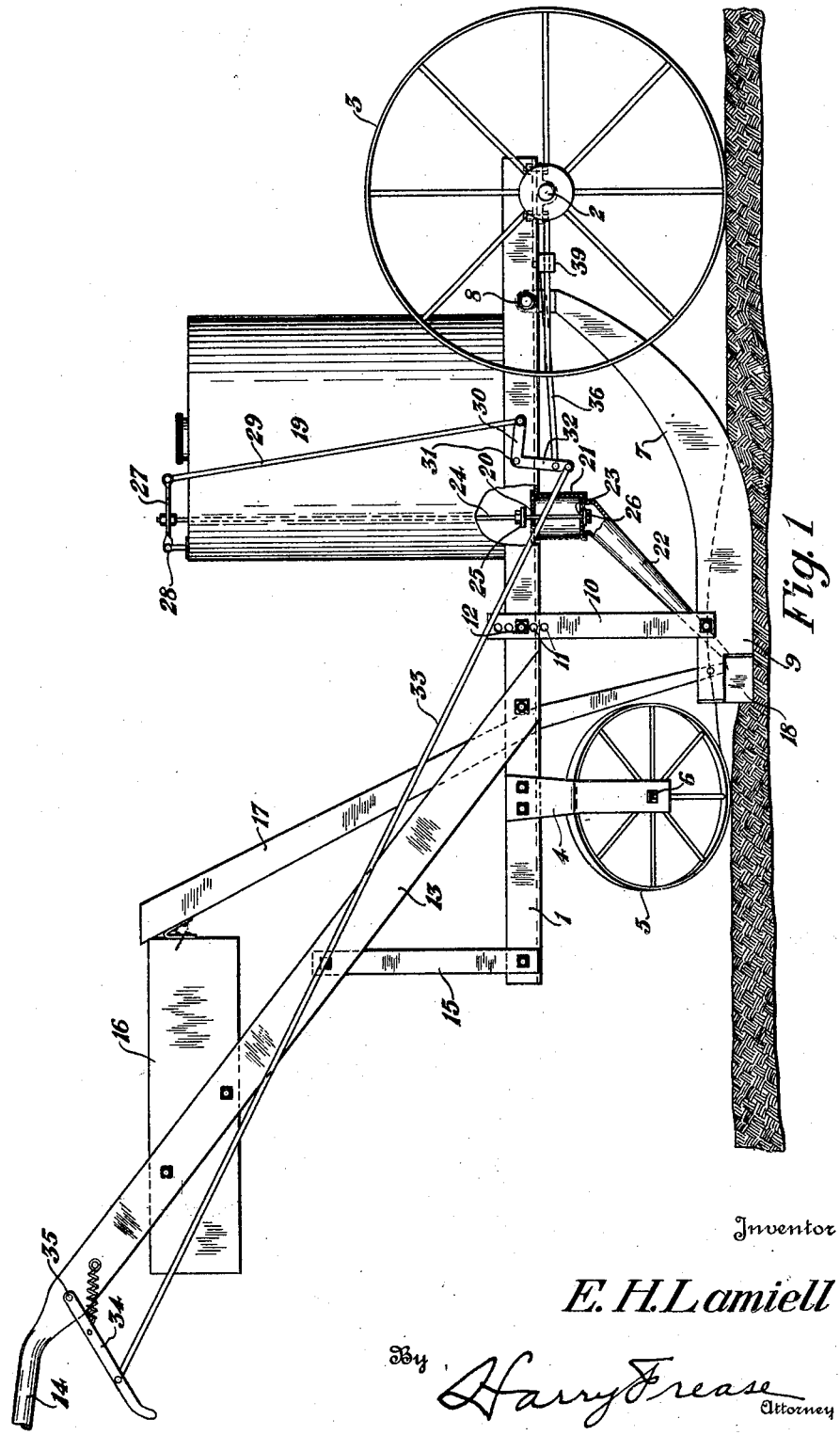
Inventor
E. H. Lamiell
By Harry Frease
Attorney Sept. 20, 1932.  E. H. LAMIELL  1,878,412
TRANSPLANTER
Filed Oct. 16, 1928  2 Sheets-Sheet 2
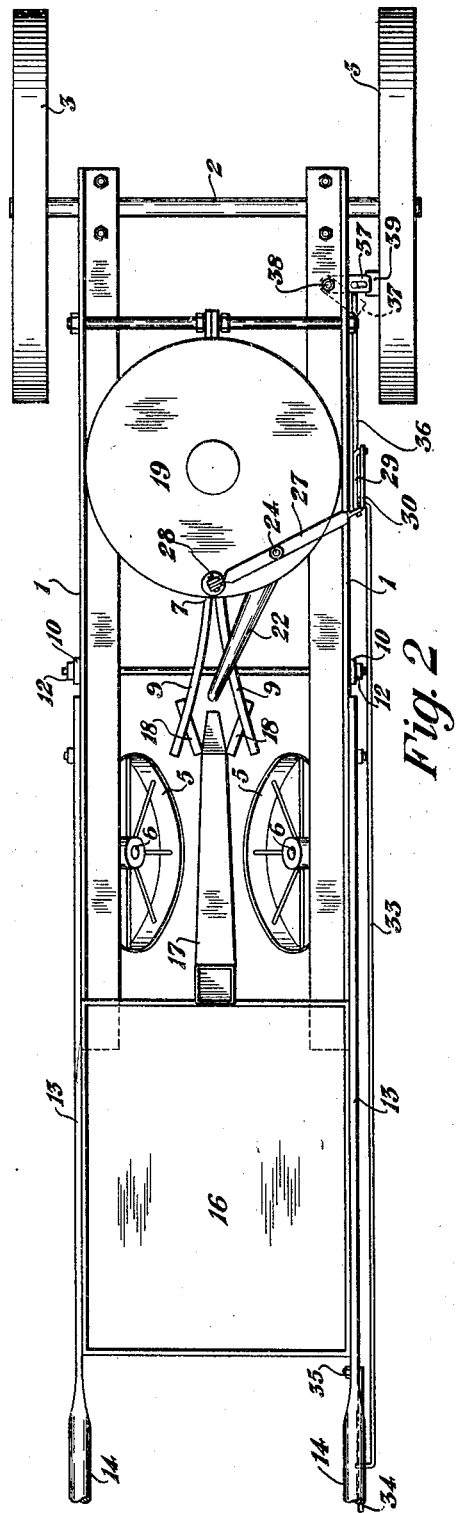
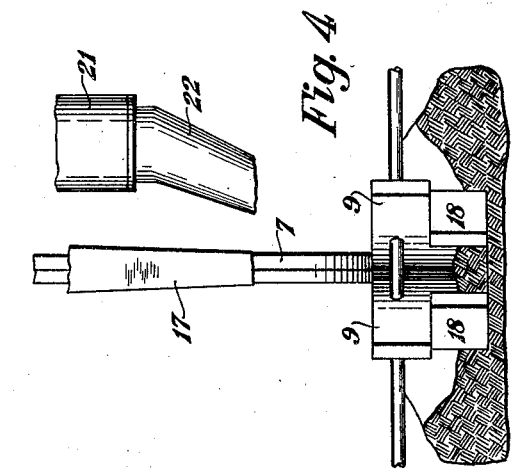
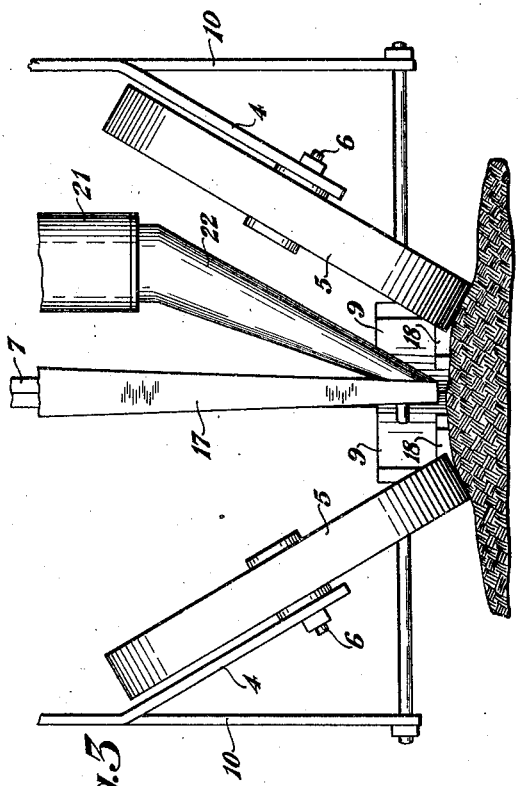
Inventor
E. H. Lamiell
By Harry Frease
Attorney Patented Sept. 20, 1932

1,878,412

UNITED STATES PATENT OFFICE

EARLD H. LAMIELL, OF GREENWICH, OHIO, ASSIGNOR, BY MESNE ASSIGNMENTS, TO THE FARM SPECIALTY COMPANY, OF GREENWICH, OHIO, A CORPORATION OF OHIO

TRANSPLANTER

Application filed October 16, 1928. Serial No. 312,865.

The invention relates to improvements in plant setters for setting and transplanting cabbage, tobacco, tomato and other plants which are first sprouted and grown to an early stage of development in beds and subsequently transplanted and set in rows in the field for complete development.

It is known that hand operated tools have been devised for setting such plants, it being necessary for the operator to assume a stooping, uncomfortable and tiring position to individually form a hole to set each plant, the plant then being set in position and covered by hand.

The object of the present improvement is to provide a small hand propelled device which will plow or dig a furrow into which the pants are set, means being provided upon the device for properly spacing the plants apart in the furrow, for watering each plant as soon as it is set and for covering the roots of the plant with earth as the device is propelled.

The above and other objects may be attained by constructing the improved transplanter in the manner illustrated in the accompanying drawings, in which Figure 1 is a side elevation of the transplanter;

Fig. 2, a plan view thereof;

Fig. 3, an enlarged fragmentary rear elevation showing the inclined rear wheels for packing the earth upon each side of the plant roots; and Fig. 4, an enlarged fragmentary view showing the shoe which forms the furrow and covers the roots of the plant with earth.

Similar numerals refer to similar parts throughout the drawings.

The device may be mounted on a frame including the side members 1 to the forward ends of which is connected the front axle 2 having the front wheels 3 journalled thereon.

Inwardly and downwardly inclined arms 4 depend from the rear portions of the side members, an inwardly inclined rear wheel 5 being journaled upon the short axle 6 carried by each of said arms. The front and rear wheels form traction means for moving the plant setter over the ground.

A shoe 7, for forming a furrow in the path of the transplanter, may be connected to the frame at its forward end as at 8 and is curved downward and backward, terminating in the diverging blade members 9 arranged for engagement with the ground to open up a furrow.

The rear portion of this shoe may be adjustably supported from the frame as by the supporting bars 10, each of which may have a plurality of apertures 11 in its upper end portion for selective engagement with a bolt or the like as shown at 12.

A pair of handles 13 are connected to the side members, at points spaced from the rear ends thereof and extended backward and upward at an angle thereto. Hand grip portions 14 may be provided at the rear extremities of these handles and braces 15 may be located between intermediate portions of the handles and the rear end portions of the side members.

A box 16 may be mounted between the upper portions of the handles for the purpose of carrying a quantity of the plants to be transplanted.

The plant tube 17 may be supported at its upper end upon the box 16 and extends downward to a point between the rear end portions of the shoe blades 9, so that the stop finger will engage the lug on the wheel at predetermined intervals for stopping the movement of the plant setter.

Rearwardly converging blades 18 may be fixed to the rear end portions of the shoe blades 9 and extended beyond the lower end of the plant tube for the purpose of scraping the earth toward the plant on each side to cover the roots of the same.

A water reservoir 19 may be mounted upon the side members and preferably communicates, through the port 20 in its lower end, with an auxiliary reservoir 21 which is provided with the spout 22 terminating at a point adjacent to the end of the plant tube.

A port 23 is provided to form communication between the lower end of the auxiliary reservoir and the spout 22. The valve rod 24 is slidably located through both of the ports 20 and 23 and provided with the valves 25 and 26 for closing said ports, respectively.

These valves are so located upon the valve rod that one port will always be open when the other is closed.

The valve rod 24 may extend to a point near the top of the reservoir 19 where it is connected to an intermediate portion of the lever 27, one end of which is fulcrumed as at 28, a link 29 being pivotally connected to the other end thereof.

The lower portion of this link may be pivoted to one arm of a bell crank 30 pivoted as at 31 upon one of the side members. The other arm 32 of the bell crank is connected to a link 33 which extends to a point near the upper end of one of the handles, being pivotally connected to an operating lever 34 which is pivoted upon the handle as at 35.

For the purpose of properly spacing the plants apart, a link 36 may be connected to the arm 32 of the bell crank lever and to a stop finger 37 pivoted as at 38 upon the adjacent side member of the frame.

In the normal position of the stop finger 37 the same is located in the path of the lug or lugs 39 which may be carried upon one or more spokes of the adjacent front wheel 3, so that the stop finger will engage the lug on the wheel at predetermined intervals for stopping the movement of the plant setter.

In operating the device the same is propelled forwardly along the ground by means of the handles 13 until the lug 39 contacts with the stop finger 37, preventing further forward movement of the device.

As the device has been propelled along the ground the diverging blades 9 of the shoe have formed a furrow in the ground.

The operator then takes a plant from the box 16 and drops the same, root down, into the plant tube 17, the plant falling through the tube and into the furrow.

The lever 34 may then be pulled toward the adjacent hand grip 14 and through the link 33, bell crank 30—32 and link 29, the lever 27 will be depressed, lowering the valve rod 24; the valve 25 closing the port 20 and preventing water from running from the reservoir 19 into the auxiliary reservoir, while the valve 26 will be moved out of engagement with the port 23, permitting the contents of the auxiliary reservoir to be discharged through the spout 22 around the roots of the plant.

This operation of the bell crank will, through the link 36, move the stop finger 37 out of the path of the lug 39, as indicated in dotted lines in Fig. 2, permitting the device to be propelled forwardly until the lug again contacts with the stop finger.

It should be understood that as soon as the transplanter starts to move forward the operator may release the lever 34, permitting the associated parts to assume the position shown in Fig. 1, closing the valve 26 and opening the valve 25, permitting the auxiliary tank to be again filled with water.

As the device is moved forward, the rearwardly converging blades 18 will scrape the earth from each side toward the roots of the plant which has just been set and will be followed up by the inclined rear wheels 5 which will pack the earth upon each side of the roots of the newly set plant.

It will be seen that by providing the auxiliary reservoir, a predetermined amount of water may be discharged upon each plant, thus obviating the possibility of flooding the plant and at the same time providing sufficient water for the purpose.

I claim:

1. A portable plant setter including a frame movable over the ground, a reservoir on the frame having a valved opening in its lower portion, means carried by the frame for forming an opening in the earth, a plant tube for discharging plants adjacent to said means, traction means for moving the plant setter over the ground, and stop means on the frame normally adapted to engage the traction means at predetermined intervals.

2. A plant setter including a reservoir having an opening in its lower portion, an auxiliary reservoir communicating with said opening and having an opening in its lower portion, a valve for each opening, means for alternately closing said valves, rearwardly diverging blades for forming an opening in the earth, a spout leading from the auxiliary reservoir opening and terminating between the diverging blades, and a plant tube terminating adjacent the spout termination between the diverging blades.

3. A portable plant setter including a frame movable over the ground, a shoe carried by the frame for forming an opening in the earth, a plant tube for discharging plants adjacent to said shoe, traction means for moving the plant setter over the ground, stop means positioned on the frame for normally engaging the traction means at predetermined intervals for stopping the movement of the plant setter, and means for moving the stop means out of normal position.

4. A portable plant setter including a frame movable over the ground, a reservoir upon the frame having a valved opening in its lower portion, means carried by the frame for forming an opening in the earth, a plant tube for discharging plants adjacent to said means, traction means for moving the plant setter over the ground, stop means normally positioned for cooperating with the traction means for stopping the movement of the plant setter at predetermined times, and means for opening said valved opening and for simultaneously moving said stop means out of normal position.

5. A plant setter including a reservoir having an opening in its lower portion, an auxiliary reservoir communicating with said opening and having an opening in its lower portion, a valve for each opening, means for alternately closing said valves, a spout leading downwardly from the auxiliary reservoir opening and terminating below the same, and a plant tube terminating adjacent the spout termination.

In testimony that I claim the above, I have hereunto subscribed my name.

EARLD H. LAMIELL.